United States Patent
Kao (10) Patent No.: US 11,056,962 B2
(45) Date of Patent: Jul. 6, 2021

(54) TORQUE TRANSFER ACROSS AN AIR GAP

(71) Applicant: Lockheed Martin Corporation, Bethesda, MD (US)

(72) Inventor: Calvin Kao, Santa Clarita, CA (US)

(73) Assignee: Lockheed Martin Corporation, Bethesda, MD (US)

(*) Notice: Subject to any disclaimer, the term of this patent is extended or adjusted under 35 U.S.C. 154(b) by 482 days.

(21) Appl. No.: 15/880,622

(22) Filed: Jan. 26, 2018

(65) Prior Publication Data
US 2019/0238043 A1    Aug. 1, 2019

(51) Int. Cl.
*B64C 3/56* (2006.01)
*H02K 49/10* (2006.01)

(52) U.S. Cl.
CPC ............. *H02K 49/108* (2013.01); *B64C 3/56* (2013.01); *H02K 49/10* (2013.01); *H02K 49/104* (2013.01)

(58) Field of Classification Search
CPC .... H02K 49/104; H02K 49/108; H02K 26/00; H02K 49/10; H02K 49/106; B64C 3/56
USPC ........................................................ 310/103
See application file for complete search history.

(56) References Cited

U.S. PATENT DOCUMENTS

| | | | |
|---|---|---|---|
| 4,340,260 A * | 7/1982 | Forster | F16C 32/0429 310/90.5 |
| 4,748,361 A * | 5/1988 | Ohnishi | H02K 21/24 310/156.36 |
| 5,310,138 A * | 5/1994 | Fitzgibbon | B64C 3/56 244/49 |
| 6,007,303 A * | 12/1999 | Schmidt | H02K 49/106 417/223 |
| 6,054,788 A * | 4/2000 | Dombrovski | H02K 49/00 310/103 |
| 6,234,938 B1 * | 5/2001 | Chen | A63B 21/00192 188/161 |
| 6,455,975 B1 * | 9/2002 | Raad | H02K 7/125 310/152 |
| 6,981,676 B2 | 1/2006 | Milliere | |

(Continued)

FOREIGN PATENT DOCUMENTS

| | | | | |
|---|---|---|---|---|
| DE | 19727550 A1 * | 2/1998 | | F16C 32/0438 |
| DE | 10155763 A1 * | 5/2003 | | H02K 49/104 |

(Continued)

OTHER PUBLICATIONS

English machine translation, Gabi DE 10155763 (Year: 2003).*

(Continued)

*Primary Examiner* — Burton S Mullins
(74) *Attorney, Agent, or Firm* — Baker Bottts L.L.P.

(57) ABSTRACT

In one embodiment, an aircraft includes a wing operable to fold along a wing fold gap. The wing comprises an inboard edge flap and an outboard edge flap, wherein the wing fold gap is between the inboard edge flap and the outboard edge flap. The aircraft further includes an input shaft operably coupled to the inboard edge flap, the input shaft mechanically coupled to a first magnetic torque coupler assembly at a first end of the input shaft. The wing further includes an output shaft operably coupled to the outboard edge flap, the output shaft mechanically coupled to a second magnetic torque coupler assembly at a first end of the output shaft. The first magnetic torque coupler assembly may magnetically couple to the second magnetic torque coupler assembly across the fold gap.

3 Claims, 4 Drawing Sheets

(56) References Cited

U.S. PATENT DOCUMENTS

| | | |
|---|---|---|
| 7,121,506 B2 | 10/2006 | Clancy |
| 7,573,170 B2 * | 8/2009 | Petro ................... H02K 21/12 |
| | | 310/156.38 |
| 7,789,339 B2 | 9/2010 | Sommer |
| 8,256,714 B2 | 9/2012 | Zhao |
| 9,010,693 B1 | 4/2015 | Barbieri |
| 9,325,212 B2 * | 4/2016 | Tangudi ................ H02K 3/46 |
| 9,334,905 B2 * | 5/2016 | Mankame ............... F16D 23/02 |
| 2006/0238053 A1 * | 10/2006 | Kascak ................ F16C 32/0493 |
| | | 310/90.5 |
| 2010/0264768 A1 * | 10/2010 | Alfermann ............ H02K 21/027 |
| | | 310/90 |
| 2010/0308947 A1 * | 12/2010 | Farb .................. H02K 49/104 |
| | | 335/306 |
| 2011/0095635 A1 * | 4/2011 | Li .................... H02K 99/20 |
| | | 310/112 |
| 2013/0285497 A1 * | 10/2013 | French ................ H02K 49/102 |
| | | 310/103 |
| 2013/0293037 A1 * | 11/2013 | Sakamoto ............. H02K 1/278 |
| | | 310/44 |
| 2014/0061380 A1 | 3/2014 | Zhao |
| 2015/0014482 A1 | 1/2015 | Weierman et al. |
| 2017/0222537 A1 * | 8/2017 | Xu ..................... H02K 49/06 |

FOREIGN PATENT DOCUMENTS

| | | | | |
|---|---|---|---|---|
| EP | 002273651 | * | 1/2011 | ........... H02K 21/042 |
| WO | WO 2014082371 A1 * | | 6/2014 | ........... H02K 49/046 |
| WO | WO 2017196269 A1 * | | 11/2017 | ............ H02K 21/24 |

OTHER PUBLICATIONS

English machine translation, Xu, WO 2014082371. (Year: 2017).*
English machine translation, Barth et al. (EP 2273651 A1). (Year: 2011).*

* cited by examiner

TORQUE TRANSFER ACROSS AN AIR GAP

GOVERNMENT INTEREST

This invention was made with government support under Contract No. N00019-16-C-0086 awarded by the Department of the Navy. The government has certain rights in the invention.

TECHNICAL FIELD

This disclosure relates generally to magnetic coupling and, mere specifically, to torque transfer across an air gap.

BACKGROUND

There are numerous applications that require the transfer of power between two or more shafts, including applications in the automotive, avionic, commercial, and industrial industries. Various types of couplers (e.g., torque couplers) may be used to transfer power from one shaft to another. This allows the shafts to exchange power while being connected to different endpoints. For instance, a first shaft may be connected to a motor, while a second shaft may be connected to a pump. By using a coupler, the two shafts may be connected so that power may be transferred from the motor to the pump. However, there exist a number of applications for which conventional couplers are impractical or inefficient.

SUMMARY OF PARTICULAR EMBODIMENTS

In accordance with the present disclosure, disadvantages and problems associated with torque transfer across an air gap may be reduced or eliminated.

In one embodiment, an aircraft includes a wing operable to fold along a wing fold gap. The wing comprises an inboard edge flap and an outboard edge flap, wherein the wing fold gap is between the inboard edge flap and the outboard edge flap. The aircraft further includes an input shaft operably coupled to the inboard edge flap, the input shaft mechanically coupled to a first magnetic torque coupler assembly at a first end of the input shaft. The wing further includes an output shaft operably coupled to the outboard edge flap, the output shaft mechanically coupled to a second magnetic torque coupler assembly at a first end of the output shaft. The first magnetic torque coupler assembly may magnetically couple to the second magnetic torque coupler assembly across the wing fold gap.

According to one embodiment, an apparatus for transferring torque across an air gap includes a first shaft mechanically coupled to a first magnetic torque coupler assembly at a distal end of the first shaft. The apparatus includes a second shaft mechanically coupled to a second magnetic torque coupler assembly at a distal end of the second shaft. The first magnetic torque coupler assembly includes a first plurality of magnets along the inside tapered edges of the first magnetic torque coupler assembly. The second magnetic torque coupler assembly includes a second plurality of magnets along the outside tapered edges of the second magnetic torque coupler assembly. The first plurality of magnets are operable to magnetically couple across a gap with the second plurality of magnets.

According to one embodiment, a torque coupler includes a first magnetic torque coupler assembly. The first magnetic torque coupler assembly includes a first inside tapered edge and a second inside tapered edge. The first inside tapered edge includes a first magnet. The second inside tapered edge includes a second magnet. The torque coupler further includes a second magnetic torque coupler assembly. The second magnetic torque coupler assembly includes a first outside tapered edge and a second outside tapered edge. The first outside tapered edge includes a third magnet and the second outside inside tapered edge includes a fourth magnet. When in an engaged position, a gap exists between the first and second inside tapered edges and the first and second outside tapered edges.

Certain embodiments of the present disclosure may provide one or more technical advantages. For example, in certain embodiments, utilizing magnetic torque coupling in the wing fold of an aircraft may reduce torsional vibration or overload transfer between coupled flaps of the aircraft, preventing damage from occurring. As another example, in some embodiments, magnetic torque coupling in the wing fold of aircraft may provide weight, cost and complexity savings over conventional solutions such as independent actuation of wing flaps and differential gearboxes. As yet another example, in certain embodiments, a hybrid torque coupler may provide improved engagement/disengagement abilities between the assemblies of the torque coupler as well as decreased size compared to conventional magnetic torque couplers. Other technical advantages will be readily apparent to one skilled in the art from FIGS. 1A through 3, their descriptions, and the claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF EXAMPLE EMBODIMENTS

To facilitate a better understanding of the present disclosure, the following examples of certain embodiments are given. The following examples are not to be read to limit or define the scope of the disclosure. Embodiments of the present disclosure and its advantages are best understood by referring to FIGS. 1A through 3, where like numbers are used to indicate like and corresponding parts.

There are numerous applications that require the transfer of power between two or more shafts, including applications in the automotive, avionic, commercial, and industrial industries. Various types of couplers (e.g., torque couplers) may be used to transfer power from one shaft to another. This allows the shafts to exchange power while being connected to different endpoints. For instance, a first shaft may be connected to a motor, while a second shaft may be connected to a pump. By using a coupler, the two shafts may be connected so that power may be transferred from the motor to the pump. However, there exist a number of applications for which conventional couplers are impractical or inefficient.

Figure 1A:
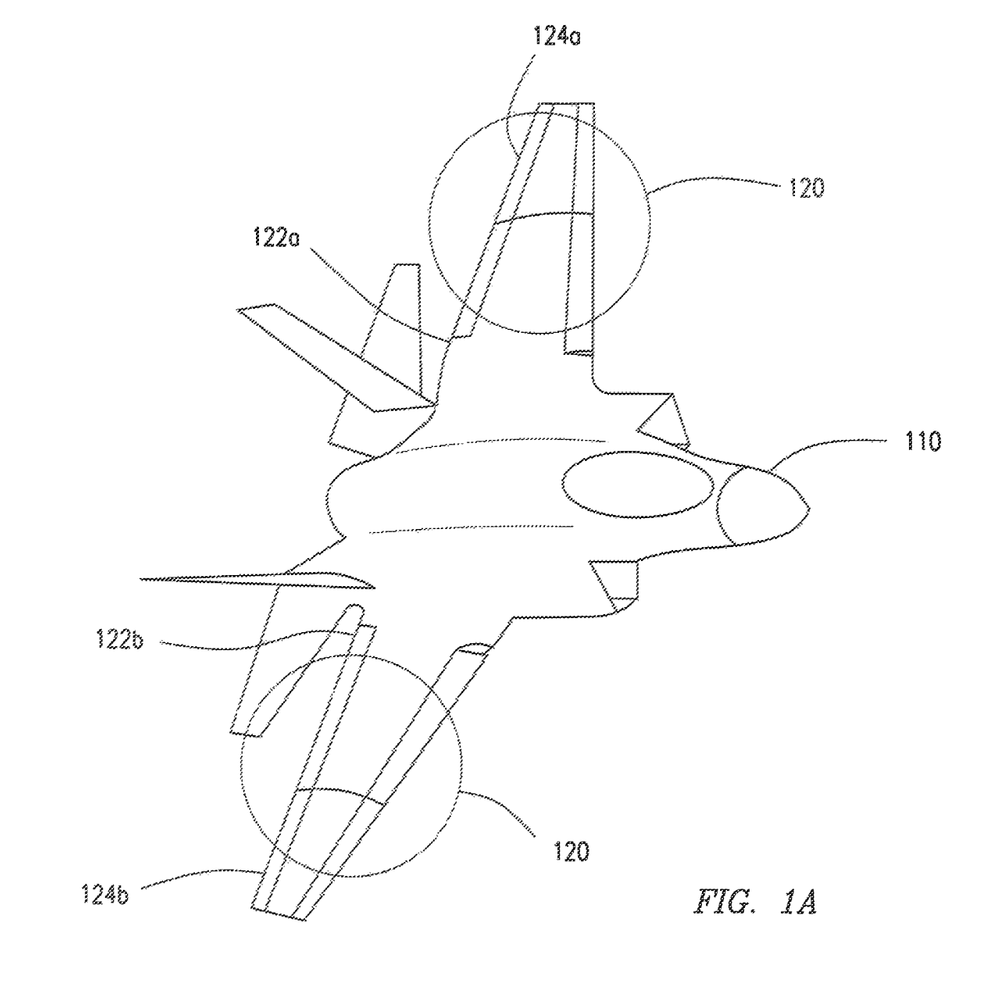
FIG. 1A illustrates an example aircraft with wings in an extended position, according to certain embodiments.
Figure 1B:
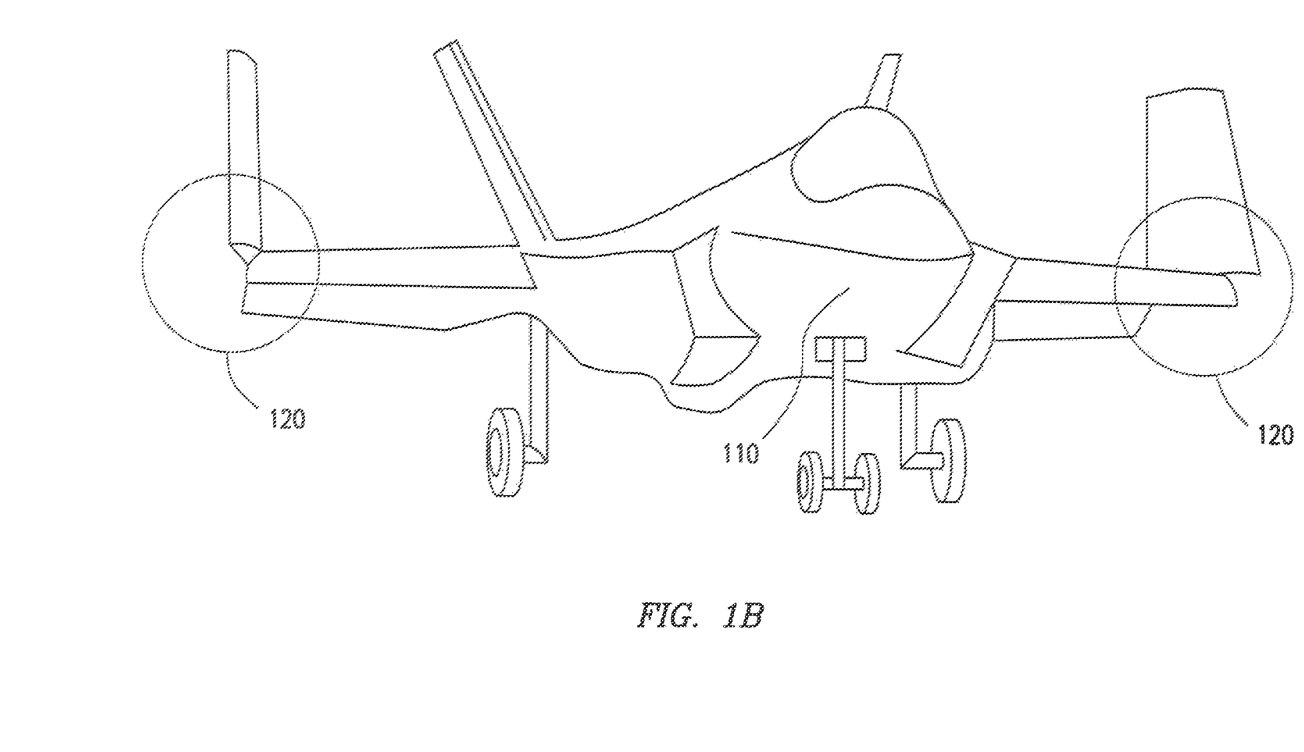
FIG. 1B illustrates an example aircraft with wings in a folded position, according to certain embodiments.

For example, FIGS. 1A and 1B illustrate an aircraft 110 with the ability to fold its wings along wing fold gaps 120. Designing aircraft 110 with the ability to fold its wings may conserve space when storing aircraft 110. FIG. 1A illustrates the aircraft 110 with its wings in an extended position, while FIG. 1B illustrates the aircraft 110 with its wings in a folded position. Although FIGS. 1A and 1B illustrate the aircraft 110 as a fighter jet, aircraft 110 may be any suitable aircraft with folding wings (e.g., drones, personal aircraft, among others).

As shown in FIGS. 1A and 1B, aircraft 110 includes inboard edge flaps 122*a-b* and outboard edge flaps 124*a-b* (flaps 122 and 124 may be interchangeably referred to as wing flaps). Generally, inboard edge flaps 122 and outboard edge flaps 124 have synchronized and symmetrical deployment. However, in aircraft having foldable wings, there exists a wing fold gap 120 between the inboard and outboard flaps. Thus, a technical issue arises: how to actuate the inboard edge flaps 122*a-b* and outboard edge flaps 124*a-b* across the wing fold gaps 120*a-b*.

Conventional solutions solve this technical issue in one of several ways. Some aircraft drive the inboard edge flaps 122 directly, while using a mechanical gearbox or complex linkages to transfer power to the outboard flap. This solution is costly and adds additional, undesirable weight to the aircraft. The additional components also require frequent maintenance and lubrication. These solutions also place limitations on the folding ability of the wings. For instance, mechanical gearbox solutions prove challenging when the wing fold hinge line is above the wing mean camber line—for instance, in wings that fold past 90 degrees.

Figure 2A:
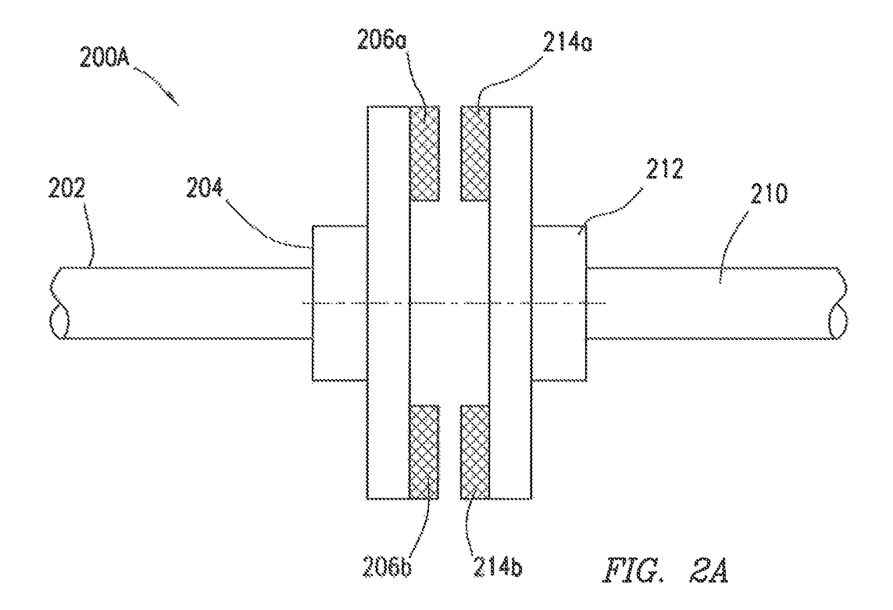
FIG. 2A illustrates an example face-to-face, magnetic torque coupler, according to certain embodiments.
Figure 2B:
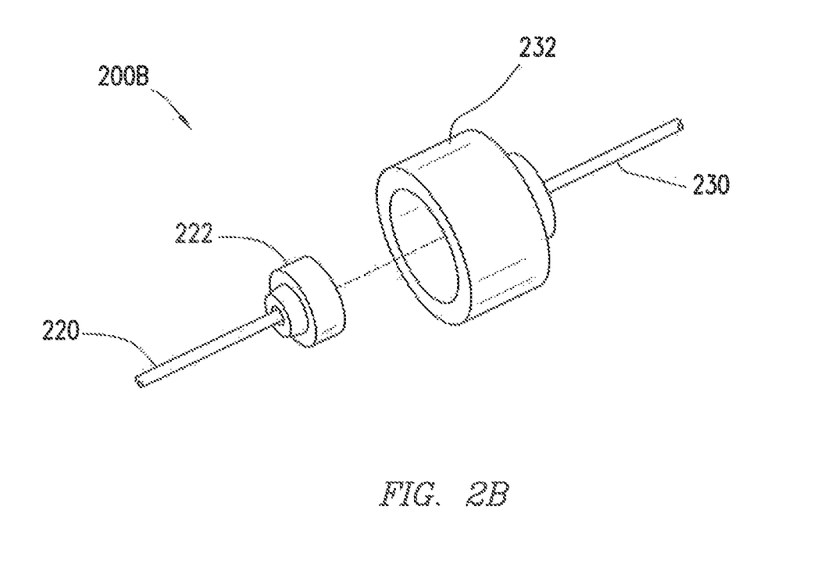
FIG. 2B illustrates an example axial magnetic torque coupler, according to certain embodiments.
Figure 2C:
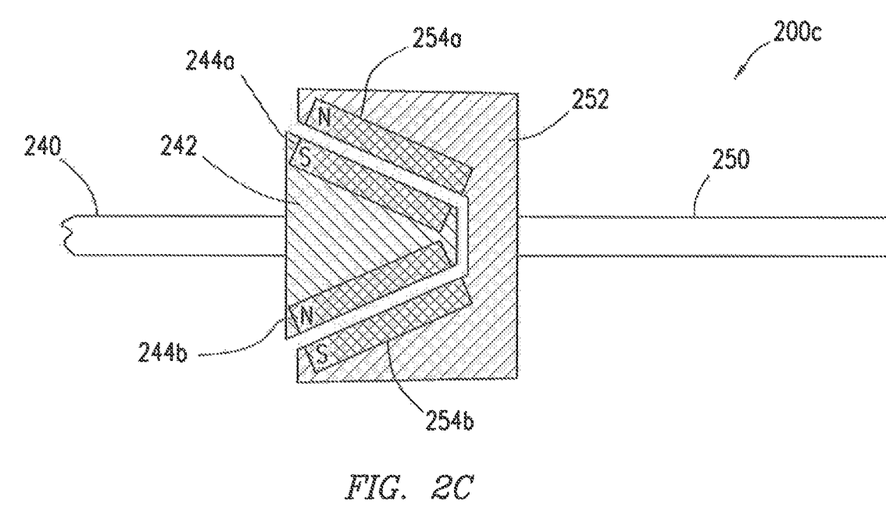
FIG. 2C illustrates an example hybrid magnetic torque coupler, according to certain embodiments.
Figure 3:
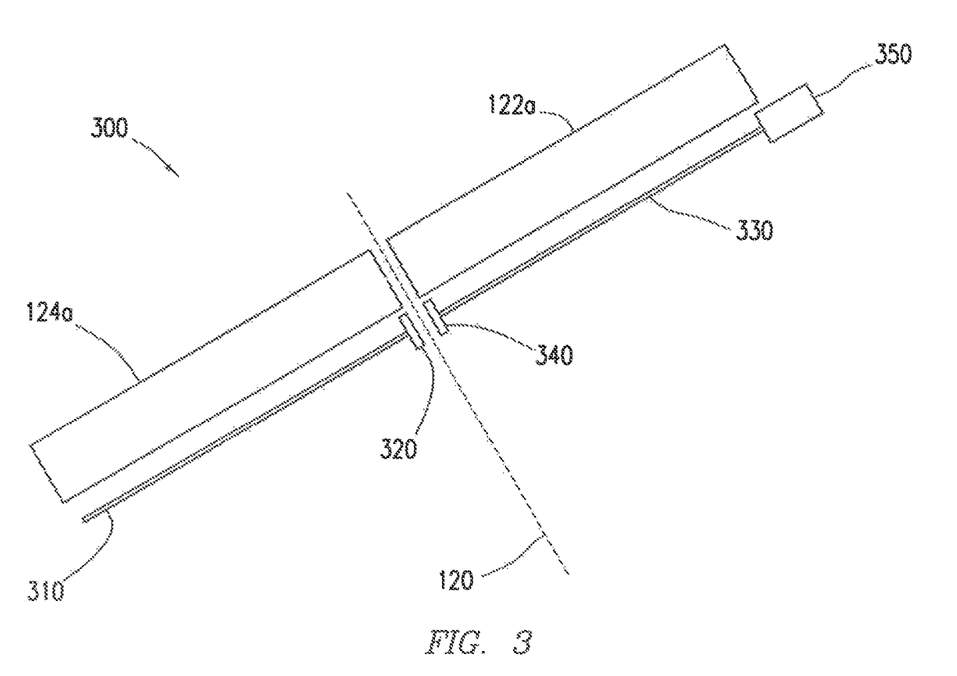
FIG. 3 illustrates an example schematic of an aircraft wing incorporating a magnetic torque coupler, according to certain embodiments.

To overcome these technical issues associated with the conventional mechanisms for providing torque across an air gap, embodiments of the present disclosure implement a magnetic torque coupler. Certain embodiments of the present disclosure may provide one or more technical advantages. For example, in certain embodiments, utilizing magnetic torque coupling in the wing fold of an aircraft may reduce torsional vibration transfer between coupled flaps of the aircraft. As another example, in some embodiments, magnetic torque coupling in the wing fold of aircraft may provide weight, cost and complexity saving over conventional solutions such as independent actuation and differential gearboxes. As yet another example, in certain embodiments, a hybrid torque coupler may provide improved engagement and spatial integration between the assemblies of a torque coupler. FIGS. 2A, 2B, and 2C describe various types of magnetic torque couplers, including a face-to-face torque coupler, an axial torque coupler, and a hybrid torque coupler, respectively. FIG. 3 provides an example schematic of how a magnetic torque coupler may be used in aircraft 110, according to certain embodiments.

FIG. 2A illustrates an example face-to-face, magnetic torque coupler 200A, according to certain embodiments. Face-to-face, magnetic torque coupler 200A comprises an input shaft 202, a first magnetic torque coupler assembly 204, output shaft 210, second magnetic torque coupler assembly 212 and magnets 206*a*, 206*b*, 214*a*, and 214*b* (collectively "magnets 206 and 214").

In the illustrated embodiment, input shaft 202 is mechanically coupled to the first magnetic torque coupler assembly 204. Similarly, output shaft 210 is mechanically coupled to the second magnetic torque coupler assembly 212. Shaft 202 and 210 may be mechanically coupled to the assemblies 204 and 212 in any suitable manner. As a non-limiting example, mechanical coupling may comprise set screw couplings, clamping couplings, welding, or any other suitable mechanism.

Magnetic torque coupler assemblies 204 and 212 may each comprise a plurality of magnets. As shown as a non-limiting example in FIG. 2A, first magnetic torque coupler assembly 204 includes magnets 206*a* and 206*b*. Similarly, second magnetic torque coupler assembly 212 includes magnets 214*a* and 214*b*. As described below, magnets 206 and 214 represent any suitable magnets that are capable of providing magnetic torque coupling between assemblies 204 and 212.

While coupler 200A may allow for the transfer of torque across an air gap (such as wing fold gap 120), there are several potential technical drawbacks associated with using face-to-face, magnetic torque coupler 200A. For instance, when the wings of aircraft 110 are changed from a folded to an unfolded position, the second magnetic torque coupler assembly 212 may move from a disengaged position to an engaged position relative to the first magnetic torque coupler assembly 204. However, as the second magnetic torque coupler assembly 212 moves into an engaged position, it is possible for the second magnetic torque coupler assembly 212 to become misaligned (e.g., angular and/or parallel misalignment) with respect to the first magnetic torque coupler assembly 204. Misalignment may cause coupler 200A to operate inefficiently, thereby degrading the ability of coupler 200A to transfer torque across an air gap. Moreover, to increase the torque handling capabilities of the face-to-face torque coupler 200A, the diameter of the assemblies 204 and 212 must increase. Thus, for space conscious applications, the face-to-face torque coupler 200A may introduce undesirable limits on the ability to transfer torque.

FIG. 2B illustrates an example axial, magnetic torque coupler 200B, according to certain embodiments. Axial, magnetic torque coupler 200B comprises an axial input shaft 220, an inner magnetic torque coupler assembly 222, axial output shaft 230, and an outer magnetic torque coupler assembly 232. Although not shown, inner and outer magnetic torque coupler assemblies 222 and 232, respectively, may each include one or more magnets.

In the illustrated embodiment, axial input shaft 220 is mechanically coupled to the inner magnetic torque coupler assembly 222. Similarly, axial output shaft 230 is mechanically coupled to the outer magnetic torque coupler assembly 232. Analogous to shafts 202 and 210 in FIG. 2A, shafts 220 and 230 may be mechanically coupled to the assemblies 222 and 232 in any suitable manner. As a non-limiting example, mechanical coupling may utilizing set screw couplings, clamping couplings, and/or welding, among others.

Inner and outer torque coupler assemblies 222 and 232 may each comprise a plurality of magnets. As explained below, any suitable magnets that are capable of providing magnetic torque coupling between assemblies 222 and 232 may be utilized.

In certain embodiments, torque may be transferred between assemblies 222 and 232 when inner magnetic torque coupler assembly 222 is engaged with outer magnetic torque coupler assembly 232. For axial, magnetic torque coupler 200B, inner torque coupler assembly 222 engages outer torque couple assembly 232 by being inserted into outer torque couple assembly 232. Then torque is transferred axially between assemblies 222 and 232 as one or more of the assemblies 222 and/or 232 are rotated.

While axial, magnetic torque coupler 200B may allow for the transfer of torque across an air gap, there are several potential issues associated with using axial, magnetic torque coupler 200b. For instance, the process of inserting (i.e., engaging) inner torque coupler assembly 222 into outer torque coupler assembly 232 requires precise alignment and therefore may be mechanically complex or even impossible depending on the direction of movement of assemblies 222 and/or 232. For example, simply moving the wings of aircraft 110 from a folded to an unfolded position may be insufficient to engage inner torque coupler assembly 222 into outer torque coupler assembly 232. Additional gears or movements may be needed to engage the assemblies 222 and 232. These additional movements and components may add additional complexity, weight, and failure points. Moreover, to increase the torque handling capabilities of the axial coupler 200B, the length of the assemblies 222 and 232 must increase. Thus, for length constrained applications, the axial torque coupler 200B may introduce undesirable limits on the ability to transfer torque.

FIG. 2C illustrates an example hybrid, magnetic torque coupler 200C, according to certain embodiments. Hybrid, magnetic torque coupler 200C comprises a input shaft 250, a hybrid outer torque coupler assembly 252, hybrid output shaft 240, a hybrid inner torque coupler assembly 242, and magnets 244a, 244b, 254a, and 254b (collectively "magnets 244 and 254").

In the illustrated embodiment, hybrid input shaft 250 is mechanically coupled to the hybrid outer magnetic torque coupler assembly 252. Similarly, output shaft 240 is mechanically coupled to the hybrid inner torque coupler assembly 242. Shafts 240 and 250 may be mechanically coupled to the assemblies 242 and 252 in any suitable manner. As a non-limiting example, mechanical coupling may utilize set screw couplings, clamping couplings, and/or welding, among others.

Hybrid torque coupler assemblies 242 and 252 may each comprise a plurality of magnets. As shown as a non-limiting example in FIG. 2C, hybrid outer magnetic torque coupler assembly 252 includes magnets 254A and 254b. Similarly, hybrid inner magnetic torque coupler assembly 242 includes magnets 244a and 244b.

As shown in the illustrated embodiment, hybrid torque coupler assemblies 242 and 252 may have tapered edges. Any suitable degree of taper may be utilized (e.g., 15°, 25, 40°, 45°, 60°, etc.). In certain embodiments, the inside tapered edge of outer assembly 252 may complimentary to the outside tapered edge of inside assembly 242.

The magnets described in the foregoing embodiments (e.g., 200A, 200B, and 200C represent any suitable magnets that are capable of providing magnetic torque coupling between the different types of assemblies (e.g., 204/212, 222/230, and 242/252). The magnets (e.g., 206/214 and 244/254) may be any suitable shape, size, and strength. Moreover, the magnets may be permanent magnets, electromagnets, or a combination of permanent and electromagnets. For example, in certain embodiments, magnets 254a and 254b may be electromagnets, while magnets 244a and 244b may be permanent magnets, or vice-versa. Although the illustrated embodiment snows hybrid inner magnetic torque coupler assembly 242 with magnets 244a and 244b, any suitable number of magnets may be used in hybrid inner magnetic torque coupler assembly 242. Similarly, although the illustrated embodiment shows hybrid outer magnetic torque coupler assembly 252 with magnets 254a and 254b, any suitable number of magnets may be used in hybrid outer magnetic torque coupler assembly 252.

Factors that influence the design of the magnets may include the operational temperature range required by the magnetic torque couplers 200A, 200B, and 200C; electromagnetic interference ("EMI") restrictions (e.g., EMI restrictions of aircraft 210), engagement/disengagement reliability, magnetic field strength, and/or slippage. The magnets may be made of any suitable material. As an example, and not by way of limitation, the magnets may be comprised of neodymium iron boron (NdFeB), samarium cobalt (SmCo), alnico, and/or ceramic or ferrite magnets.

The polarity and/or magnetic orientation of the magnets may be selected in any suitable fashion that allows the magnets to transfer torque across a gap between the assemblies. For instance, in certain embodiments, magnets 244 and 254 may be shaped as arc magnets.

As explained above, in certain embodiments, magnets 244 and/or 254 may be electromagnets. For example, in some embodiments, magnets 254a and 254b of outer assembly 252 may be electromagnets powered by a power drive controller. According to certain embodiments, when magnets 254a and 254b are electromagnets, outer assembly 252 may be stationary while inner assembly 242 may rotate.

Hybrid magnetic torque coupler 200C may provide a number of technical benefits not offered by face-to-face, magnetic torque coupler 200A and/or axial, magnetic torque coupler 200B. In some embodiments, one technical benefit may provide improved engagement and disengagement of hybrid inner torque coupler assembly 242 from hybrid outer torque coupler assembly 252. By utilizing a hybrid insertion style of engagement, hybrid magnetic torque coupler 200C avoids many of the misalignment issues encountered by face-to-face magnetic torque coupler 200A. Hybrid magnetic torque coupler 200C also provides improved engagement and disengagement, especially about a hinge line (e.g., a hinge line in a wing fold of an aircraft).

FIG. 3 illustrates an example schematic 300 of an aircraft wing incorporating a magnetic torque coupler, according to certain embodiments. Schematic 300 includes inboard edge flap 122a and outboard edge flap 124a of aircraft 110. As shown in the illustrated embodiment, the wing is operable to fold along wing fold line 120 (illustrated by the dotted line) located in between the inboard edge flap 122a and the outboard edge flap 124a.

An input shaft 330 is operably coupled to the inboard edge flap 122a in order to actuate inboard edge flap 122a. Input shaft 330 is mechanically coupled to a first magnetic torque coupler assembly 340 at a first endpoint of the input shaft 330. Similarly, an output, shaft 310 is operably coupled to the outboard edge flap 124a in order to actuate outboard edge flap 124a. Output shaft 310 may be mechanically coupled to a second magnetic torque coupler assembly 320 at a first end of the output shaft.

As shown in schematic 300, the first magnetic torque coupler assembly 340 is magnetically coupled to the second magnetic torque coupler assembly 320 across or around the wing fold line 120. In certain embodiments, this may allow the second magnetic torque coupler assembly 320 to engage/disengage the first magnetic torque coupler assembly 340 when the wing is folded/unfolded. When magnetically engaged, the first and second magnetic torque couplers 320 and 340 may be operable to act as a torque coupler between input shaft 330 and output shaft 310. The first and second magnetic torque coupler assemblies 320 and 340 may be part of any suitable torque coupler, including but not limited to face-to-face, magnetic torque coupler 200A; axial, magnetic torque coupler 200B; and hybrid, magnetic torque coupler 200C as described in FIGS. 2A-C.

As described above, the first and second magnetic torque couplers 320 and 340 may comprise permanent magnets, electromagnets, or a combination of both. In certain embodiments, input shaft 330 may be to a torque generating device 350 such as an engine or a power drive controller.

To illustrate using a non-limiting example, in certain embodiments, torque generating device 350 may be an engine or motor and may be operable to mechanically rotate input shaft 340. The first and second magnetic torque coupler assemblies 320 and 340 may comprise permanent magnets. As the torque generating device 350 rotates input shaft 330, the first magnetic torque coupler 340 also rotates. If the wing of aircraft 110 is in the unfolded position, the first and second magnetic torque coupler assemblies 320 and 340 may be engaged and magnetically coupled about the wing fold line 120. Due to the magnetic coupling between assemblies, the rotation of the first magnetic torque coupler assembly 340 is operable to cause the second magnetic torque coupler assembly 320 to rotate, thereby rotating output shaft 310 and transferring the torque generated by torque generating device 350 across the wing fold line 120.

To illustrate using another non-limiting example, in certain embodiments, torque generating device 350 may be a power drive controller. The first magnetic torque coupler assembly 340 may comprise electromagnets and the second magnetic torque coupler assembly 320 may comprise permanent magnets. Torque generating device 350 (as a power drive controller) may energize the electromagnets thereby generating a magnetic field in the electromagnets of the first magnetic torque coupler assembly 340 by transmitting electrical signals (e.g., wirelessly or through wire) to the first magnetic torque coupler assembly 340. The generated magnetic field in the first magnetic torque coupler assembly 340 may cause the permanent magnets in the second magnetic torque coupler assembly 320 to also rotate, thereby rotating output shaft 310.

The forgoing examples are merely illustrative and are not to be considered limiting. While embodiments of the present disclosure have been disclosed using an aircraft wing, these disclosures were merely exemplary and are not limiting. The technical benefits provided by the hybrid magnetic torque coupler 300C, including improved engagement/disengagement capability, ability to fold across the gap in torque coupler assemblies (e.g., assemblies 242 and 252), and the ability to separate a power source from fluids or other external elements. For example, in submarine applications and space systems it is desirable to separate the power source from control surfaces in order to prevent the power source from becoming exposed to the elements (e.g., water, heat, cold, etc.). The hybrid torque coupler 300C also provides technical benefits for applications with folding or detachable pieces such as missile components and robotics. The hybrid torque coupler 300C may also be implemented in tools, appliances, and other devices utilizing rotary power. For example, hybrid torque coupler 300C may be utilized in blenders, lawn care appliances (weed eater, trimmers, edger, blower, etc.), and power tools, among others.

Although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Moreover, while particular components were described in terms of their specific names to help distinguish between components, these components may be referenced more generically. For example, hybrid input shaft 250 may simply be referred to as input shaft 250. Likewise hybrid outer torque coupler assembly 252 may be generically referred to as a torque coupler assembly.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A torque coupler, comprising:
    a first magnetic torque coupler assembly, comprising:
        a first inside tapered edge comprising a first magnet; and
        a second inside tapered edge comprising a second magnet; and
    a second magnetic torque coupler assembly comprising:
        a first outside tapered edge comprising a third magnet; and
        a second outside tapered edge comprising a fourth magnet; and
    a power drive controller coupled to the first magnetic torque coupler assembly;
    wherein:
        the first magnetic torque coupler assembly is configured to remain stationary;
        the second magnetic torque coupler assembly is configured to rotate;
        the second magnetic torque coupler assembly is configured to disengage from the first magnetic torque coupler assembly by moving from an engaged position to a disengaged position;
        when in the engaged position, the first magnetic torque coupler assembly is configured to magnetically couple with the second magnetic torque coupler assembly across an aircraft wing fold gap;
        when in the disengaged position, the first magnetic torque coupler assembly does not magnetically couple with the second magnetic torque coupler assembly across the aircraft wing fold gap;
        the first and second magnets are electromagnets;
        the second and third magnets are permanent magnets; and
        the power drive controller is operable to energize the first and second magnets of the stationary first magnetic torque coupler assembly, thereby causing the second magnetic torque coupler assembly to rotate.

2. An apparatus for transferring torque across an aircraft wing fold gap, the apparatus comprising:
    a first shaft mechanically coupled to a first magnetic torque coupler assembly at a first end of the first shaft, wherein the first shaft and the first magnetic torque coupler remain stationary;
    a second shaft mechanically coupled to a second magnetic torque coupler assembly at a distal end of the second shaft, wherein the second shaft and the second magnetic torque coupler assembly are operable to rotate;
    the first magnetic torque coupler assembly comprising a plurality of electromagnets along the inside tapered edges of the first magnetic torque coupler assembly;

the second magnetic torque coupler assembly comprising a plurality of permanent magnets along outside tapered edges of the second magnetic torque coupler assembly; and a power drive controller coupled to a second end of the first shaft that is opposite the first end of the first shaft;

wherein the second magnetic torque coupler assembly is operable to disengage from the first magnetic torque coupler assembly by moving from an engaged position to a disengaged position;

wherein, when in the engaged position, the plurality of electromagnets are operable to magnetically couple with the plurality of permanent magnets across the aircraft wing fold gap;

wherein, when in the disengaged position, the plurality of electromagnets do not magnetically couple with the plurality of permanent magnets across the aircraft wing fold gap; and wherein the power drive controller is operable to energize the plurality of electromagnets of the stationary first magnetic torque coupler assembly, thereby causing the second magnetic torque coupler assembly and the second shaft to rotate.

3. The apparatus for transferring torque across the aircraft wing fold gap of claim 2, wherein one or more of the first, second, third, and fourth magnets are selected from the group consisting of neodymium iron boron magnets, samarium cobalt magnets, and alnico magnets.

* * * * *